March 24, 1970    D. SILVERMAN    3,502,069
METHOD AND APPARATUS FOR PLACING IN AND RETRIEVING
A TUBULAR PROBE FROM A BODY CAVITY
Filed Oct. 20, 1965                                                            4 Sheets-Sheet 1

Daniel Silverman    INVENTOR.

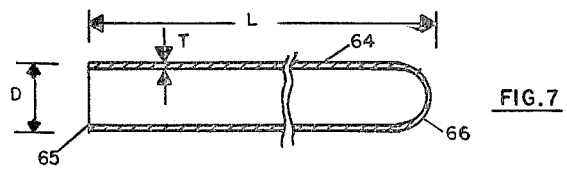
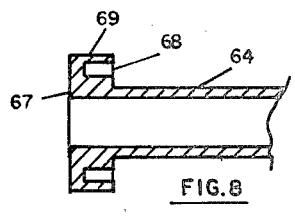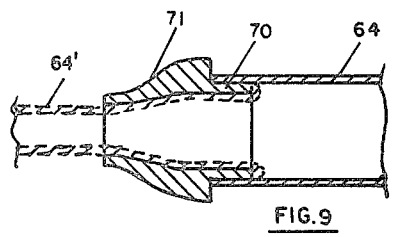
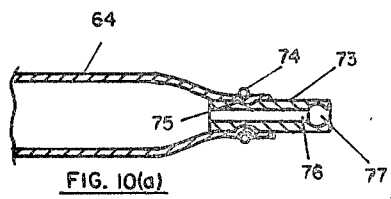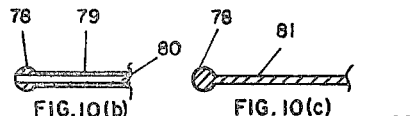
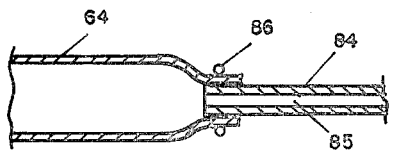
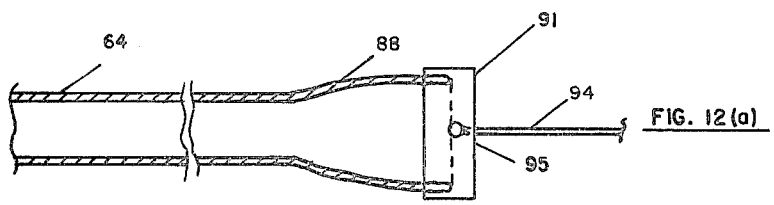
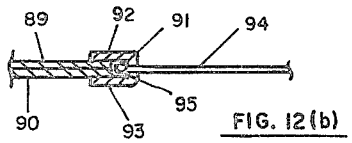
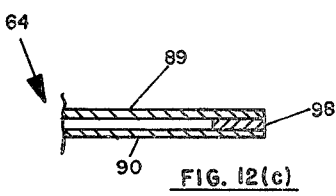

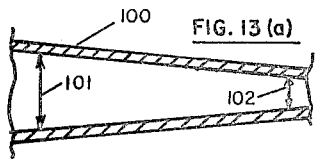
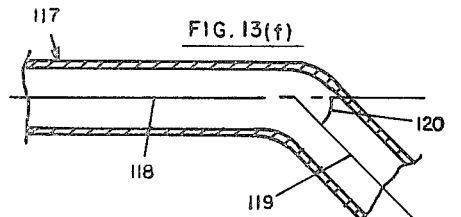
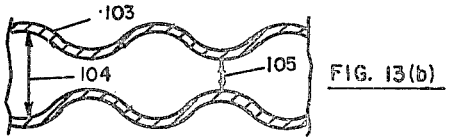
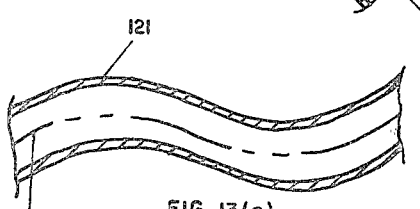
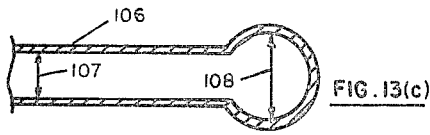
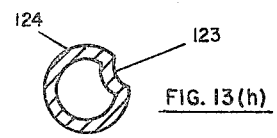
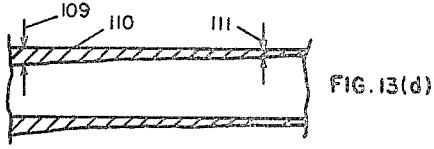
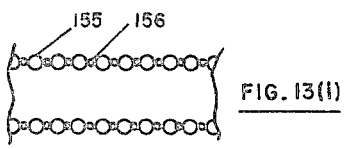
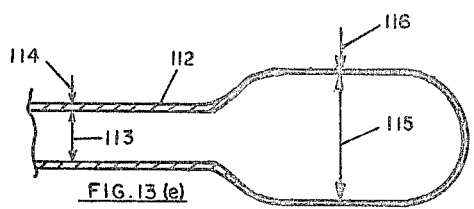
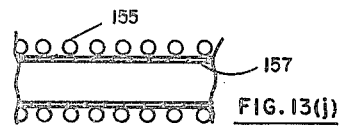
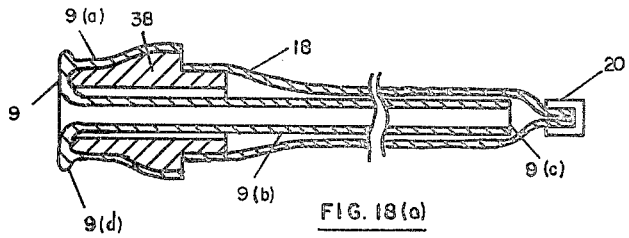
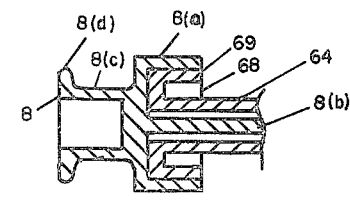

Daniel Silverman
INVENTOR.

United States Patent Office 3,502,069
Patented Mar. 24, 1970

3,502,069
METHOD AND APPARATUS FOR PLACING IN AND RETRIEVING A TUBULAR PROBE FROM A BODY CAVITY
Daniel Silverman, 5969 S. Birmingham St., Tulsa, Okla. 74105
Filed Oct. 20, 1965, Ser. No. 498,653
Int. Cl. A61b *10/00, 17/24;* A61m *35/00*
U.S. Cl. 128—2                                    46 Claims

ABSTRACT OF THE DISCLOSURE

This invention is concerned with an instrument for the placement of a sampling, inspecting or treating device within an extended body cavity. The instrument comprises a rigid tubular casing and a flexible eversible tubing inside the casing. One end of the tubing is closed and the other end is sealed circumferentially over an open end of the casing. The other end of the casing is closed. Means are provided to pump fluid into the casing at a pressure higher than the pressure outside the casing, to evert the tubing out of the open end of the casing. Means are provided to pump fluid out of the casing at a pressure lower than the pressure outside of the casing, to invert the tubing back into the casing. Various embodiments of tubular probes may be used in the instrument.

---

This invention relates to the placement of a sampling, inspecting, or treating device within an extended cavity or tubular chamber that may have linear and nonlinear portions. Because of the nature of the cavity a rigid mechanical device could not be introduced into such a cavity and a thin flexible member is not self-sustaining and cannot be "pushed" into the cavity.

More specifically, this invention relates to the art of medical apparatus including those instruments which are concerned with the sampling, inspecting, and treating of the walls of internal body cavities. Further, this invention is an impovement on that embodied in my U.S. Patent 3,168,092, issued Feb. 2, 1965, and entitled "Medical Probing Instrument Having Flexible Extrudable Tubing Adapted to be Extraverted Under Pressure Into a Body Cavity."

Although the apparatus of my patent is useful for the purposes intended, the present invention extends the application to smaller diameter cavities and permits the manipulation of a wider variety of instrumentation. It also extends the techniques which may be followed in practicing the invention.

Briefly described, my invention utilizes an elongated, fluid confining chamber or casing having circumferential side walls and two end closures. One end closure of the tubular casing has an opening which is adapted to be placed in communication with the cavity. This opening also permits the introduction and/or the retrieval of a thin wall flexible tubing to be introduced into the cavity. A length of such tubing in collapsed form has one end closed and is placed within the casing. One end of the tubing remote from the cavity is closed. The other end of the flexible tubing is open and is secured circumferentially to the opening in the end closure of the casing. The entire length of tubing comprises the end closure for that end of the casing.

Means for introducing a fluid within the casing and about the flexible tubing stored therein is provided and such fluid displaces the tubing progressively from the casing by everting the lead end which is the first to be extruded from the casing.

Thus, the collapsible thin wall flexible tubing is progressively extraverted and progressively projected from the casing into the cavity as pressure and/or displacement fluid is applied to the annulus between the collapsed tubing and the casing wall. Means are provided for maintaining the displacing fluid within the casing under the maintained pressure and this can include both control and indicator means.

As will become apparent, as the tubing is being extraverted/extruded, the trailing end of the flexible tubing moves out of the casing and into the extruded inflated tubing. The trailing end may carry a retrieval means and/or may transport into the cavity and within the extraverting tubing a wide variety of instruments which may sample, inspect or treat the areas within and adjacent the cavity. The collapsed tubing within the casing may contain medicating, sampling, and/or opaquing materials which are brought in direct contact with the walls of the cavity when the flexible tubing is extraverted as described. Such materials within the collapsed tubing might also comprise adhesive, adsorbent, or other materials whereby samples of the cavity wall can be obtained.

These and other new and novel techniques and benefits derived from the use of my invention will become apparent as my description thereof proceeds with reference thereof from the attached drawings, wherein.

FIGURES 5(*a*), 5(*b*) and 6 show schematically different embodiments of end closures including fluid control means.

FIGURES 7, 8, 9, 10(*a*), 10(*b*), 10(*c*), 10(*d*), and 11 show various embodiments and details of flexible, elongated probes for use in this invention. FIGURE 10(*a*) illustrates a type of closure which is adapted to receive a tubular extension (FIG. 10(*b*)), a cord or rod extension (FIGURE 10(*c*)) or a closure (FIGURE 10(*d*)).

FIGURES 12(*a*), 12(*b*) and 12(*c*) show details of temporary closure means for the closed end of the probe. FIGURES 12(*a*) and 12(*b*) show views of a removable metal clip. FIGURE 12(*c*) shows the end of the tubing temporarily cemented closed.

FIGURES 13(*a*), 13(*b*), 13(*c*), 13(*d*), 13(*e*), 13(*f*), 13(*g*), 13(*h*), 13(*i*) and 13(*j*) show other embodiments of the probe.

FIGURES 14(*a*), 14(*b*), 14(*c*) and 15 show different embodiments to probes utilizing two flexible tubes.

Figure 16:
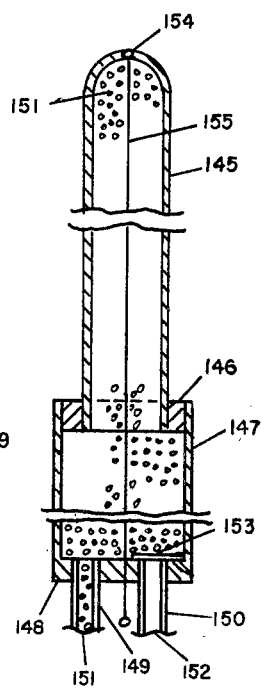

FIGURE 16 is an embodiment utilizing a fluid composed of microspherical particles.

Figure 17:
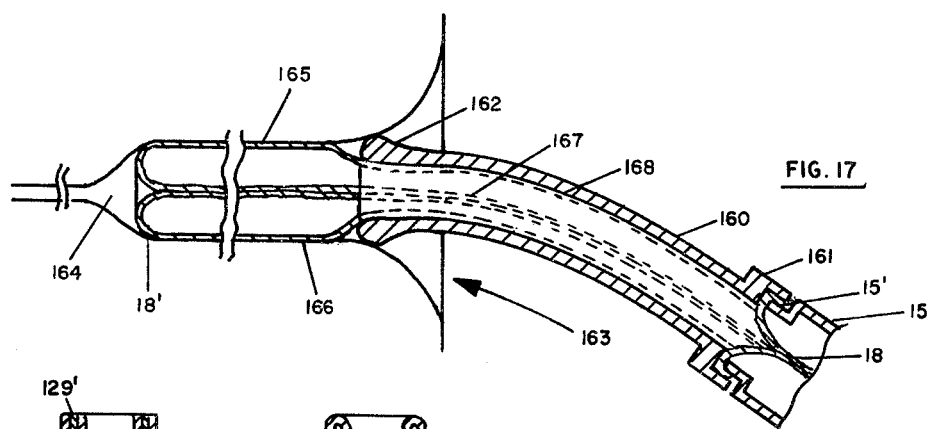

FIGURE 17 is an embodiment utilizing a long flexible nosepiece to direct the probe into the cavity, and FIGURES 18(*a*) and 18(*b*) illustrate embodiments of a protector tube to be used with probes.

Figure 1:
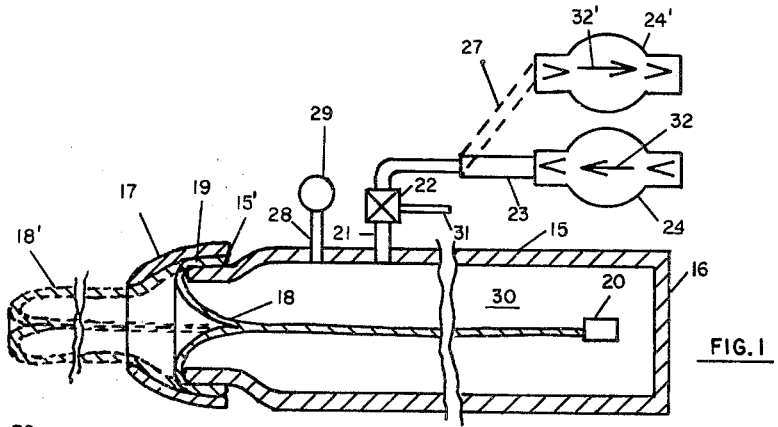
FIGURE 1 is a schematic cross section of one embodiment of this invention.

In FIGURE 1 is shown one embodiment of my invention comprising a chamber, casing or container 15 with one end closure 16. The second end of the casing can be a wall with an opening therein, or it can be a section of the casing of reduced diameter 15'. A length of flexible, thin walled tubing 18, which may be called an extravertable probe, is placed inside out, in the form of a cuff 19 and placed over the open end 15' of casing 15. This can be fastened in pressure tight relation by any means well known in the art. One way to hold it in place is by means of the tapered nose piece or nozzle 17, which may be used to introduce the probe into the cavity. The inner end of the tubing 18 is sealed against internal pressure by one of the many means well known in the art, shown schematically as 20. The properties of the tubing or probe will be discussed more fully in connection with FIGURES 7–15, inclusive.

The casing 15 can be of rigid construction such as of metal, or it can be made of flexible material, such as thin metal or plastic. It may be compressible, but should not be extensible to any appreciable extent under the internal pressure in the casing. The internal volume 30 is filled with fluid through pipe 21, and valve 22 by means, such as the hand operated aspirator pump 24. These are common articles of commerce and generally comprise a hollow rubber ball with two diametrically opposed openings in which are inserted check valves. Thus, compressing the ball forces air out through one valve, and releasing the ball allows it to expand and draw in air through the other valve. These bulbs can be used to force air into a container, or to withdraw air from a container, by turning it end for end. This is shown schematically by the dotted tubing 27 connected to the aspirator turned (in accordance with the direction of the arrow 32') to draw air out of the casing. Thus, the movement of air or other gas into or out of the casing 15 is under the immediate and fine control of the operator.

While the aspirator bulb is adequate for handling gases, a more substantial type of pump may be needed for liquids. There are many models of small hand operated liquid pumps that could be used in the same way to force liquid into the casing or out of the casing, by fine control. In place of turning the aspirator or pump end for end, some simple velve assembly can be used, such as indicated schematically by 56 in FIGURE 6, as is well known in the art, and need not be described here.

For the purpose of indicating the pressure in the casing, I show a pipe 28 leading to the inside of the casing and a pressure indicator 29, which can be of the conventional type of pressure gauge, mercury manometer or something as simple as an extensible rubber balloon, which by its size, indicates the approximate magnitude of the internal pressure.

The embodiment of FIGURE 1 works in the following manner. The tubing or probe is sealed on one end, 20, which is then inserted, closed end first, into the chamber 15 through open end 15'. The second, open end of the tubing is turned inside out to form a cuff 19 which is fitted over the end 15' of the casing. The cuff 19 is held in place by means of the nozzle or nose piece 17. Attaching the aspirator 24 to force air into the chamber, and with valve 22 open, the air pressure inside the chamber is increased, and the tubing is extraverted out the opening of the nozzle, in accordance with the dotted outline 18'. As more air is forced into the casing, there will be greater extrusion of the tubing until it is fully extraverted.

To retrieve the tubing, all that is necessary is to reverse the aspirator bulb 24', and withdraw air from the chamber 15. This will cause the tubing to be withdrawn into the casing, in a manner which is the reverse of the process of extrusion of the tubing. The action would be substantially the same with a liquid as the displacing fluid in the casing.

Consider the case with air as the displacing fluid, with a resultant pressure P in the chamber to fully extravert and inflate the probe. As the pressure P is reduced, the volum of the inflated probe will be reduced. This can be accomplished by a reduction in diameter (that is, a partial collapse) or an introversion of the tubing at the remote end. In general, the probable action will be to collapse the probe and to "suck" it into the casing by introversion at the month of the casing 15', pulling the collapsed tubing out of the cavity. It is possible, by proper design of the tubing, or probe (as will be discussed in connection with FIGURE 13) to prevent this, and to cause the tubing to introvert at the extreme position first.

Figure 4:
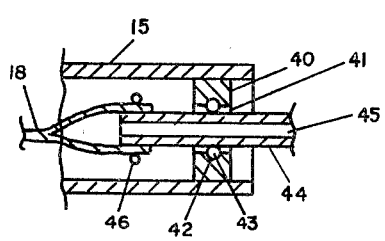
FIGURE 4 shows one form of end closure for the casing.

In my patent U.S. 3,168,092, I show how, by the use of a retrieval means, such as a cord or rod or other tension member such as 44 in FIGURE 4, it is possible to maintain pressure in the casing, as indicated by 29, and by pulling on the closed end of the tubing 18 by member 44, cause it to introvert at the extreme point of the extruded tubing. This causes the tubing to pull away from the wall, without sliding, and to be pulled into the center of the inflated portion of the tubing.

One of the problems of using this instrument is to assemble the probe inside of the casing and to keep all parts sterile. Thus, the handling required to form the cuff 19, etc., can be avoided by preforming a termination or cuff 34 on the open end of the tubing or probe 18, as in FAIGURE 2. This termination 34 can be of complaint material, cemented or otherwise fastened to, or molded as part of the tubing 18. It can provide a lip 36 and groove 35 such as that when the end 15' of the casing is inserted into the groove 35 and the nozzle 17 slipped over the lip 36, the probe is mechanically held and pressure sealed to the casing.

Figure 3:
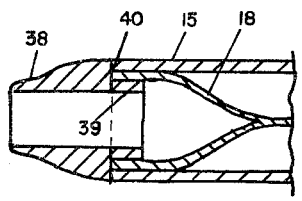

In FIGURE 3 is shown another termination for the probe tubing 18 in which it is fastened, such as by cementing, or molding, to the nozzle or nose piece 38, at an extension 39. Now the probe and nozzle are one piece and the probe can be handled by grasping the nozzle 38, slipping the closed end of the probe into casing 15, until the end of the casing lands against the shoulder 40. This should be a tight enough fit so that the internal pressure in the chamber will not cause separation at this point. There are many variations of these embodiments by which the probe can be provided with a termination to facilitate the assembly of the probe into the casing.

FIGURE 1 shows the end closure 16 as an integral part of the casing. This is not a necessary requirement. For example, the casing 15 in FIGURE 3 can be a simple piece of tubing, with the nozzle termination at one end, and a plug, such as a rubber stopper at the other end. In my co-pending application entitled "Method and Apparatus for Placing In and Retrieving a Tubular Probe from a Body Conduit," I show a termination comprising a plug of complaint material through which tubular needles or other small diameter tubular elements can be inserted and sealed into the casing.

In FIGURE 4 is shown a closure 40 in the casing 15 which includes an opening 41 with a small O ring 43 or equivalent resilient compliant seal positioned in a groove 42. This can be used to seal a slender cylindrical rod or tube 44 through the closure. Shown is a small bore thick-walled tube 44 with internal bore 45 sealed through the closure, and sealed into the end of tubing 18 by means of clamp 46 or equivalent. The cylindrical element 44 represents only one of a variety of instrumental means which can be used to examine or treat the internal walls of the cavity into which the probe 18 is to be inserted. Thus, means 44 can be a rod or cord, tube, optical or electrical instrument, or other device as is described in my Patent U.S. 3,168,092.

In connection with FIGURE 1 it was described how the probe tubing 18 could be retrieved by reducing the pressure and applying a suction to the casing 15. If the probe is carrying an instrument means such as 44, it may be desirable to apply tension to the means 44 and to retrieve the probe tubing at the same time. To do this it would be desirable to maintain pressure in the casing to prevent the inflated probe from collapsing until the remote end has been introverted back into the inflated portion and into the casing. Of course, a simple cylindrical cord, rod, or other tension member can be used in place of tube 44. This will not only provide means to retrieve the probe, but also can serve to restrain the extraversion of the tubing from the chamber to prevent the bodily movement of the tubing 18 to to the nozzle where it might prevent the orderly extraversion of the tubing. Thus, in use, the tension member 44 can be used to restrain extraversion and also assist in the introversion process for retrieval.

Figure 5A:
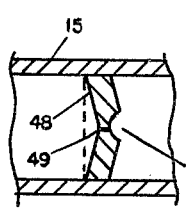
Figure 5B:
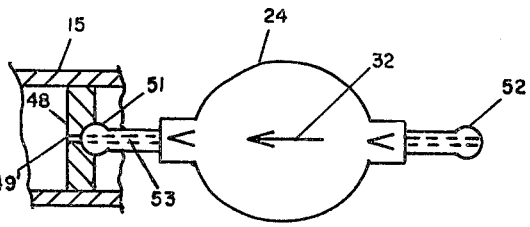

In FIGURES 5(a) and 5(b), I show in schematic detail the so-called Dole valve or regulator. This is generally a fairly rigid rubber diaphragm 48, that is normally concave. On the concave side it has a small orifice 49 of such diameter that when the diaphragm is in the concave position, the orifice 49 is substantially closed and pressure tight. On the convex side is formed a concave spherical seat 50, suitable for the introduction of one spherical end 51 of the aspirator bulb 24. The orifice 49 communicates with the seat 50. Now when the end 51 of the aspirator 24 is pressed against the seat 50, the diaphragm is forced into a plane configuration, the orifice opens 49' and the aspirator can then force air into, or withdraw air out of the casing (using the appropriate end 51 or 52 of the aspirator). When the aspirator is withdrawn from the seat, the diaphragm again takes on the concave form and the orifice 49 is closed. The diaphragm 48 would be mounted as an end closure of the casing 15, for example, as shown, or it could be mounted in a circular opening in the wall of the casing.

Figure 6:
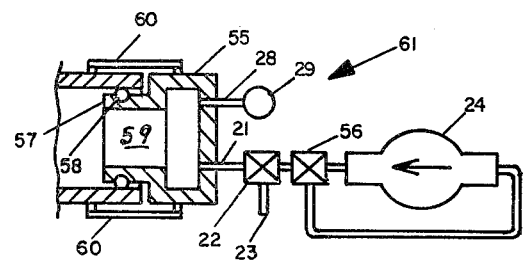

In FIGURE 6 is shown a variation on the embodiment of FIGURE 1 in which there is no end closure of the casing. Thus, the casing 15 can be nothing more than a length of tubing, plastic, or metal, cut off square on each end. One end can be terminated in the probe nozzle 38 of FIGURE 3, for example. The other end is terminated in a fixture 61. This comprises a cup shaped chamber 55 with a reduced diameter portion 57 carrying pressure seal means such as the O ring 58, to seal the fixture 61 to the casing 15. The chamber 55 carries the pressure control and indication means shown in FIGURE 1 as part of the casing. In addition to the parts shown in FIGURE 1, the fixture 61 includes also a valving means shown schematically as 56, which can connect either the pressure or suction end of the aspirator bulb 24 to the chamber 55 and to the casing 15. There are many examples of such valve systems in the art, and the means 56 need not be described further.

So far there have been described the design, construction and use of complete instruments employing long flexible tubing-like probes to explore, examine and treat long conduits and cavities in the body. The most critical part of these instruments is the probe and there will now be discussed some embodiments of probes, useful in these instruments.

In FIGURE 7, is shown one embodiment of a probe. It comprises a simple tubular element 64, open at one end 65 and closed at the other end 66. The length of the element is L, the diameter D and wall thickness T. The material of which the probe is made is a thin walled flexible tubing of one of the many types of plastic elastomeric materials such as polyethylene, polyvinyl chloride, rubber, etc. This material should be flexible, though not necessarily extensible. (However, in connection with FIGURE 13 there will be discussed embodiments that do include extensible materials.) There is a type of rubber-like material which, for low or moderate pressures, does not extend but which for higher pressures extends roughly in proportion to the pressure. All of these materials can be used in probes designed for particular applications.

The length of the probe is determined by the length of the conduit or cavity that is to be explored. It is obvious that the length must at least be such as to reach from the mouth of the cavity to the most remote point in the cavity that is to be explored or treated. It will be clear that the length of the probe can be greater than this distance, that is, a probe of length L can be extended into a cavity a distance kL which is only a fraction K of this length, the remainder $(1-k)$ L of the length L, not extraverted, simply remains, still collapsed inside of the expanded extraverted length, or inside the casing. Thus, treatments can be made throughout the full length of a cavity even though at any one point, only the fraction kL is extraverted. In general, the major use of this device might be in the treatment or exploration of cavities or conduits at least 2 inches or more in length. The upper limit depends on the particular application. For example, examination of the gastro-intestinal tract might involve lengths of probes of many feet in length. Similarly, the diameter of the probe is a variable which depends on the application. While a probe ½ to 1 inch or more in diameter might be used in treatment of the colon, a much smaller probe, perhaps ⅛ to ¼ inch or less might be used in exploring the esophagus, or a vein or artery. It is believed that the major use of this device would involve probes of diameters in the range of ⅛ inch to 2 inches or more, with the greatest use in sizes of the order of ½ inch to 1 inch diameter.

The thickness of the probe material is likewise a variable dependent on the application, the diameter and length of the robe, and the probe material. The greater the ratio of thickness to diameter of the probe, the greater the difficulty in everting (turning inside out) the tubing. Also, the stiffer the material of the tubing, the more difficulty in everting. For example, soft pliable material, such as thin rubber tubing will evert more easily than a stiff plastic tubing of the same T/D ratio. As an example, soft rubber tubing .010" wall thickness and ½ inch diameter is evertable with only low or moderate fluid pressures.

Figure 2:
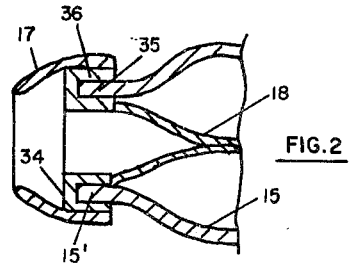
FIGURES 2 and 3 show alternate constructions for the evertible tubing to facilitate sealing to the casing.

The embodiment of FIGURE 7 is suitable for use in the instrument illustrated in FIGURE 1. However, it is preferred to provide a hub, header, terminator, or fastening means 67 as part of the open end of the probe. This is illustrated in FIGURE 8. It might be used in conjunction with the casing 15 and nozzle 17 of FIGURE 2, and could be rapidly placed in position and sealed to the casing. It is important, in the design of the probes which can be separately packaged and sterilized, that they be easily installed in the instrument without excessive handling. The termination 67 can be of the same material as the probe tubing, or it can be made of elastomeric self-sealing material attached by well-known means to the tubing. The semi-rigid termination provides a "handle" by means of which the probe can be handled without contaminating the tubing.

In FIGURE 9 there is shown another embodiment in which the probe combines the nozzle 71 and the tubing 64. This assembly provides a better "handle" to remove the sterile probe from its sterile container and insert it into the chamber. The tubing 64 can be attached to the nozzle 71 by any convenient means such as molding or cementing, etc.

Since these instruments and probes are to be used for medical examinations and treatments, it is important that they be sterile before use. Since some of the probe materials that may be chosen because of their chemical or mechanical properties may not be able to withstand the high temperatures of autoclaving, they will have to be sterilized by other means, such as irradiation by gamma rays, for example. Thus the separately sealed and packaged probe must be installed in the instrument with a minimum of handling. Thus, the embodiment of FIGURES 2, 3, 8, and 9 are important.

In FIGURE 7 the probe is shown as a closed tubing. This closure 66 can be made during the process of manufacture, or an open end of the tubing can be closed by means of a closure element. This is illustrated in FIGURES 10, 11, and 12. FIGURE 11 might be called a "slow connect" means, in which the open end of the tubing 64 is slipped over a plug, rod or tube 84 and clamped in pressure tight relation by means 86. There are other possible types of closures that might be called "quick connect" means. Such a one is illustrated in FIGURE 10a, where the tubing 64 is slipped over and sealed (by means of clamp 74) around a molded or machined metal or plastic element 73. This has a longitudinal axial conduit 76, and a concave spherical seat 77, adapted to permit entry of, and to hold the spherical end of an auxiliary element. One such element, shown in FIGURE 10(b), would be a capillary tube 79 with spherical end 78 and central conduit 80. When the spherical end 78 is inserted into 77, the conduits 76 and 80 are in communication, and there is essentially no leakage out of the spherical seat 77. This type of quick connect means would serve for FIGURE 4, for example. If connection to a cord or rod is desired, then the fitting in FIGURE 10(c), comprising the rod or cord 81 with spherical end 78 would be used. Or if it is desired simply to close the end of the probe, a fitting like that of FIGURE 10(d) can be used. The spherical knob 78 serves to close the conduit 76, while 82 serves as a handle to remove the fitting when desired.

There may be times when it is desired to provide a temporary closure on the inner end of the probe, one such way, as described in my Patent U.S. 3,168,092, is to provide a closure such as the spring clip 91, FIGURE 12, which is pressed over the flattened end of the tubing 88. This clip 91 has two arms 92, 93, which are pressed over layers 89, 90. A cord 94 is passed through an opening and fastened 95 inside the U of the clip. The cord 94 is of adjustable length and can be anchored to a point in the casing. Then, as the end of the tubing moves out as the probe is extraverted from the casing, a position is reached where the cord 94 is extended full length. Then any further extrusion of the probe pulls the end of the tubing 88 out of the clip 91. The tubing end is then unsealed, and, if the probe is fastened to the nozzle, as in FIGURE 9, in the dotted position 64', the casing can be removed, leaving the nozzle inserted in the mouth of the cavity with the probe tubing lining the cavity, for the insertion of instruments, etc.

In FIGURE 12(c) there is shown another embodiment in which the end of the tubing 64 is flattened and the two walls 89, 90, held closed by means such as a layer of cement 98. This cement must not have too high a tensile strength. Then, as the cemented end of the tubing finally reaches the point where it is to be everted, as it is turned inside out, the sides of the tubing 89, 90, peel away from each other, breaking the cement bond, and opening the end of the tubing.

In FIGURE 13, there are shown a number of embodiments of the probe, illustrating a number of ways in which the shape, size, chemical nature, mechanical and other properties of the probe can be varied in order to obtain particular advantages in the use of this invention.

In FIGURE 13(a) there is shown a portion of a probe 100 in which the diameter varies from a large value 101 to a smaller value 102. The diameter can vary with length in any desired way. FIGURE 13(a) shows a linear variation of D with length L. FIGURE 13(b) shows an undulatory or cyclically varying diameter 104 to 105, etc. FIGURE 13(c) shows another way in which the diameter can vary, to provide one or more enlarged sections such as 108 in a tubing of diameter 107. These enlarged sections can be used for placement of medication, fixtures, instruments or devices, etc.

The embodiment of FIGURE 13(e) is different from that of 13(c). In FIGURE 13(e) two different materials or different treatments are used to manufacture the probe. The portion of the probe 112 indicated as of diameter 113 and thickness 114 is formed of a material of low or moderate extensibility. The end portion, indicated as of diameter 115 and thickness 116 is made of a material of high extensibility, which under the same pressure in the probe will expand to a larger diameter. Thus a probe of smaller diameter than the cavity can carry a portion that will eventually be extraverted and expand to fill the cross section of the cavity. While the portion of high extensibility is shown at the end of the probe, more than one such section may be provided, spaced at desired points along the length of the probe.

In FIGURE 13(d) there is shown an embodiment in which the thickness T of the tubing 110 varies with length. Again, this variation can follow any desired function. In the figure, the thickness varies linearly with length from 109 to 111. This particular form of probe is useful to ensure that as the pressure is reduced inside the probe, the tubing will introvert at the end of the thinnest wall first and then progressively introvert toward the thick end.

In FIGURES 13(f), 13(g), and 13(h) are shown probes which are made of a material such as polypropylene that has a "memory" and when extraverted and inflated take on a predetermined shape. In FIGURE 13(f), the shape provides a sharp bend, the axis 118 turning to 119 through an angle 120. This can be useful for directing the probe into a particular side channel where there is a bifurcation of the original cavity or conduit. The embodiment 13(g) shows the inflated probe with a desired axial variation. One such variation can be helical form. One of the important uses of this helical form is to provide a space around the probe to prevent complete closing off the cross section of the cavity. FIGURE 13(h) shows another way of accomplishing this. This shows a cross section of the inflated probe 124 in which a depressed channel 123 is provided which continues along the probe. If the probe tends to fill the cross section of the cavity or conduit, there will be a longitudinal passage 123 that permits fluids to flow past the probe.

In FIGURES 13(i), 13(j) there are shown two other embodiments in which a porous tubing, such as might be provided by a knitted Dacron tubing, with threads shown schematically as 155, is impregnated with a plastic or latex material 156 to fill the interstices between the threads. If a material such as polyvinyl alcohol, or a collagen-like material is used which can be reacted upon and/or dissolved by body fluids, a nonporous probe tubing at insertion, can be converted into a porous tubing at some later time. Thus, a probe of this nature, (or one like FIGURE 13(j)) in which a thin impervious collagen-like liner 157 is used in conjunction with a porous or knitted tubing 155, can be used to line an artery, passing through a section where an enlargement, or aneurism is present, and form a new strong wall inside of the aneurism. As the assimilable material is dissolved, blood will leak into the interstices of the tubing 155 and clot and eventually form a new artery wall.

Figure 14A:
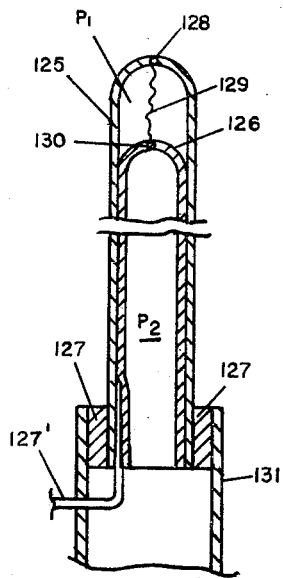
Figure 15:
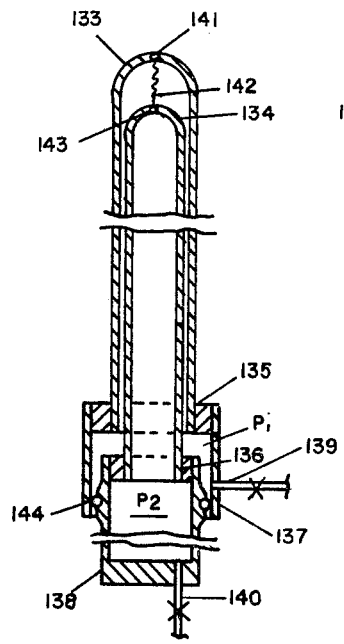

In FIGURES 14 and 15 are shown another type of probe comprising two or more separate tubings. These may be joined together at their open end where they are fastened to a termination shown schematically as 127 for the tubings 125 and 126, FIGURE 14. Or they can be fastened separately to their own terminations such as 135 for the outer tubing 133 and 136 for the inner tubing 134 in FIGURE 15.

In FIGURE 14 the tubing 125 is shown fastened at 128 to a tension member 129, which is also fastened at its other end to the tubing 126 at 130. Consider that air or other gas, at a pressure $P_1$ is placed in the space between the two tubings. Then, if the pressure $P_2$ inside the inner tubing 126 is higher than $P_1$, the probe will be extruded outward into the cavity. Then when $P_2$ is made less than $P_1$, tubing 126 will collapse and will be introverted at its base (at the termination 127) carrying with it, due to the tension member 129, the outer tubing 125. Thus control of the relative magnitudes of the two pressures $P_1$, $P_2$ will cause extroversion of the probe 125, or introversion, as desired.

FIGURE 15 shows two tubings 133, 134, as in FIGURE 14, but here, the inter-tubing space, $P_1$, is separately controllable (at opening 139) from the space $P_2$ inside the inner tubing, which is controlled at opening 140. Since the pressures are separately controllable, more positive and precise action is possible with the embodiment of FIGURE 15 and than with that of FIGURE 14. However, by providing tube means 127' into the space between the two tubings 125, 126, the pressure $P_1$ can be changed at will.

In FIGURE 15 it is possible to make the material of the outer tubing different from that of the inner tubing. For example, the outer tubing could be porous so that fluids pumped through 139 into the space $P_1$ could flow through pores in 133 along the walls of the cavity to provide treatment of one sort or another to the cavity.

The embodiment of FIGURE 15 is shown as comprising essentially two separate instruments. The outer one consists of tubing 133, termination 135, casing 137, and fluid pipe 139. The inner instrument comprises tubing 134, termination 136, fluid pipe 140, and casing 138. This is adapted to slip inside of the casing 137, and to be pressure sealed by means 144. The two tubings may or may not be connected together at their closed ends, as shown.

Figures 14B, 14C:
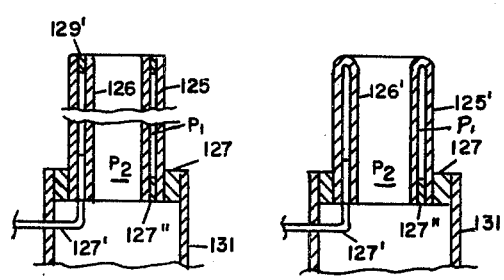

Instead of having the tubings 125, 126 of FIGURE 14a or 133, 134 of FIGURE 15 closed at their ends as shown, they can be fastened together by a circumferential seal 129' of FIGURE 14b, for example, and left open through the main conduit. Control of the pressure $P_2$ (using a permanent or temporary closure such as in FIGURE 10 or 12) will position the probe in the cavity, and control of the pressures $P_1$ and $P_2$ will retrieve the probe by introversion. The open end of the tubings permits insertion of instruments or devices into the cavity beyond the end of the tubings. FIGURE 14c shows how it is possible to make the double walled tubing from a single length of thin-walled flexible tubing that is introverted into itself to provide an outer wall 125' and an inner wall 126' with the two ends of the tubing sealed together circumferentially and to the termination 127.

In connection with FIGURES 12(a) and 12(b) I have explained how the internal end of the tubing can be left open, so that once it is in place in the cavity, it can serve as a lining through which instrumental means can be inserted into the cavity. However, to evert the tubing out of the instrument casing it is necessary to provide a temporary closure for the open end. Such a closure can be a spring clip such as 91 of FIGURES 12(a) and 12(b) tied to a tension member of predetermined length, such that when the end of the tubing is everted to the desired point, the clip will be pulled off the end of the tubing, thus opening the end of the tubing.

The tubing probes of FIGURES 14(b) and 14(c) can be used in the same way. In these figures, the tubings are shown in their everted positions. When they are in their inverted positions inside the instrument casing, the end of the double-walled tubing probe (as at 129') can be pressed together and held closed by means, such as the clip 91 of FIGURE 12. Then as the probe is everted to the point where the clip is pulled off, the everted probe will look like FIGURE 14(b) and similarly for the probe of FIGURE 14(c).

It will be clear when the probe is everted, as in the position shown in FIGURES 14(b) and 14(c), that if the pressure $P_1$ is increased, the internal volume of the annular space between the two layers 125, 126 will increase, and the inner tubing 126 (and 126') will collapse and the internal passage through the tubing 126 (or 126') and the probe will be closed. In this position, if the pressure $P_2$ inside the casing is reduced below the pressure outside the casing, the probe will be drawn into the casing and will be inverted in the process.

It will also be clear that when the probe is inside the casing, if the fluid pressure $P_1$ is increased, the internal tubing will collapse (as above) and the probe will be closed. Then, increasing the pressure $P_2$ inside the casing will cause the probe to be everted. Then when $P_1$ is reduced, the probe will again assume the configuration of FIGURES 14(b) and 14(c).

At times it is desirable to make a three-dimensional model or impression of the inside surface of a conduit or cavity. The embodiment of FIGURE 14a provides a means of doing this. In the space between the two tubings 125 and 126 is placed a polymerizing cement, that will bind together the two walls of the tubings in whatever relative position they are placed. The tubings are then everted and pressed outward against the wall of the cavity. The surface of the outer tubing will assume all of the convolutions of the inner surface of the cavity. This expanded condition is maintained until the cement has polymerized and binds the two tubings together. While the cement will hold them together, they can still be inverted to be withdrawn from the cavity, and after retrieval they can be everted again to show the true contour of the inner surface of the cavity.

If desired a thin layer of this polymerizing compound can be placed on the inner surface (before inversion) of the outer tubing so that when everted into the cavity and expanded to press on the walls, the polymerizing material will harden to show the fine detail of the surface. Another possibility is to make the outer tubing itself of a polymerizing material. Pressure inside of the tubings will press the outer tubing against the cavity surface and hold it there while it hardens in the shape of the cavity walls. In this case it is possible to place the polymerizing hardener or catalyst in the intertubing space.

One material that can be used for this purpose is Devcon. This is manufactured by the Dow Chemical Company of Midland, Mich. However, there are many other plastic compositions of this sort described in the literature which can be be used to make a true replica of the inner surface of the cavity.

In describing the various embodiments of probes in FIGURES 7 to 15, some mention was made as to their material. They may be made of any suitable material that has the desired mechanical and/or chemical properties. The material can itself be radiopaque, so that it will cast a recognizable shadow when exposed to X-rays, or it can be compounded with a dense metal powder so as to be effectively radiopaque. Thus, its progress into and out of the cavity can be observed and studied. Conversely, the liquid used to extravert the probe can be radiopaque, or carry a powder that is radiopaque.

Also, as is described in my Patent U.S. 3,168,092, the probe material can be treated on its outer surface (when extraverted) to have a material that will attach to itself and hold to the surface of the tubing, flakes of tissue or other particles, liquids, or other materials that can be introverted with the tubing and carried out of the cavity.

Once the material from the walls of the cavity is attached to the surface of the probe, and the probe is retrieved, it can again be- exposed and examined by extraverting the probe into a clear plastic or glass tube so that the probe will press against the inner wall of the tube. Or the probe can be extraverted into an open tray so that the material adhering to its surface can be removed and more closely examined. When the probe is extraverted in this way, the position along its length, of each sample, corresponds directly to the position in the cavity from which the sample was taken.

In FIGURE 16 is shown an extraverted probe 145, termination 146, casing 147 with two fluid pipes 151, 152. Pipe 152 has a fine mesh screen 153 across its inlet into the chamber. Shown schematically as 151 are a plurality of microspheres of glass or plastic. These are minute spheres that are available on the market. These microspheres can be used as a fluid, which will have properties different from those of a liquid or a gas. For example, if the liquid is drained out of the probe through 152, the probe will still be extended along its side walls, and can be retrieved by releasing spheres at 151 while pulling on the retrieval cord 155 attached to the probe at 154.

In FIGURE 1 the casing 15 is shown as a substantially rigid tubular chamber. It will be of considerable length, particularly if the probe is a long one. While many applications will only require probes perhaps 10 inches in length or less, there are cavities, such as the colon and intestines, which, to be fully explored many require probes many feet in length. This requires a corresponding length of casing to retrieve the long probe by introversion. Some such means as that shown in FIGURE 2 of my Patent U.S. 3,168,092 may be used to wind the tubing on a drum to permit shortening the length of the casing. Conversely, it is possible to make the casing itself out of a length of fairly rigid-walled plastic tubing that can be coiled up to be handled more easily than a long stiff casing. This is fully described in my co-pending application entitled "Method and Apparatus for Placing in and Retrieving a Tubular Probe from a Body Conduit."

If the casing is long and rigid, it is possible to use a long flexible nose piece so that the probe can more easily be introduced into the cavity. This is shown in FIGURE 17, where the casing 15, 15' and tubing 18 are similar to FIGURE 1. Instead of the short nozzle 17, a long flexible nose piece 160, of any desired length can be used. The diameter need not be greater than the diameter of the tubing 18, and can be considerably less, just so long as the collapsed portion 167 can slide freely inside the inflated portion 168 along the wall of the nosepiece. The nosepiece 160 has a termination 161 at one end to lock the tubing, as was done by 17 in FIGURE 1. Any form such as 162 can be used at the other end of the nosepiece to facilitate entry of the probe into the cavity. This nosepiece is shown placed at the mouth 163 of the cavity 164. The probe tubing which is shown as 18 collapsed in the casing, has been extraverted through the nose piece as 168 and into the cavity as 18'. There it has inflated to its full diameter, pressing outward the walls 165, 166 of the cavity.

Referring again to FIGURE 3, I show a termination for the probe 18 in the form of a nozzle or nose piece 38. This nozzle can be used to handle the sterile probe while inserting it into the instrument casing. In FIGURE 18(a), I show an improved embodiment of this probe. This includes a paper or plastic "protector tube" 9 with a fairly rigid tube portion 9b and a turned-back or cuff portion of such size and shape as to form a tightly fitting cover or protector 9a. This may have a circumferential ridge 9d for stiffness and to make it easier to remove the protector from the termination or nozzle. The length of the tube 9b is such that its end 9c is approximately at the end of the tubing 18, that is, the part that is sealed closed by the clip 20.

In FIGURE 18b, I show another embodiment of a protector tube which is particularly adapted to fit the probe of FIGURE 8. This protector 8 has a cylinder portion 8b, which can be of any cross sectional shape, so long as it has sufficient rigidity to support the probe tubing 64.

In use, the protector tube 8 or 9 serves to protect the sterile probe and termination. When it is grasped by the handle 8c or cuff 9a, the rigid rod 8b or tube 9b then serves to stiffen the probe and make the step of inserting the probe (the end 20 first) into the casing. After the termination and probe are pressed and sealed into the casing 15 (FIGURE 3) the protective cover 8a or 9a is removed with its tube 9b or rod 8b, and the probe is ready to use.

While the use of this invention has been described in terms of its use primarily in connection with closed tubular conduits or cavities, it will be clear that it can be used equally well in any cramped, tortuous, constricted passage or fissure, where it can be used to lift and spread the walls. For example, the probe of this invention can be extraverted into any wedge-shaped space, such as the space near the edge of contact between a human or animal body and a supporting surface. Thus, it is possible to direct this probe into that space, and use the fluid pressure inside the probe tubing to lift the body from the surface. This application is particularly useful since the act of placing the probe under the body is accomplished without sliding contact with the body.

This invention is susceptible to a wide variety of embodiments, some of which have been described, and many more of which will be obvious to one trained in the art, and is not to be construed as being limited to the specific apparatus and processes described above. The scope of this invention is limited only by the scope of the appended claims.

I claim:
1. A medical instrument for placing a flexible tubular probe into a tubular body cavity comprising a tubular casing with at least one end closure, a collapsed long thin-walled flexible tubing placed inside said casing, the inner end of said tubing closed, the outer end of said tubing circumferentially sealed to a transverse opening in said casing at the end opposite to said at least one end closure, means connected to said casing for introducing fluid into said casing at a pressure higher than the pressure outside said casing, and means connected to said casing for removing fluid from said casing at a pressure lower than the pressure outside said casing, whereby, when the fluid pressure inside said casing is higher than the pressure outside said casing, the fluid pressure will evert said tubing out through said opening, and when the pressure inside said casing is less than the pressure outside said casing, the fluid pressure outside will cause said tubing to be inverted back into said casing.

2. The medical instrument of claim 1 in which said means for introducing fluid is a hand operated fluid pump with pressure and vacuum generating terminals, and means to connect to said casing either said pressure or said vacuum generating terminals.

3. The medical instrument of claim 1 including a tension member connected to said closed end of said tubing and means to control said tension member from outside said casing.

4. The medical instrument of claim 1 in which the closed end of said tubing is sealed over the end of a small bore tube of length at least as great as the length of said tubing.

5. The medical instrument of claim 1 in which the end of said casing opposite to said closure is fitted with a flexible nose piece adapted to be placed adjacent the mouth of said cavity and through which said tubing is extraverted into said cavity.

6. The medical instrument of claim 1 in which said end closure is provided with at least one transverse opening including resilient means to seal the passage of a thin cylindrical element through said opening.

7. The medical instrument of claim 1 in which the said end closure comprises a convex thick-walled flexible diaphragm fitted into said casing, a small orifice passing through said diaphragm at its center, said orifice adapted to be closed when the diaphragm is in concave form, and open when the diaphragm is made plane by pressure on the convex surface thereof, and means to connect fluid conduit means to said orifice from the convex side.

8. The medical instrument of claim 1 in which the inner end of said tubing is closed by a temporary closure means, removable when the end of said tubing has moved to a predetermined position.

9. The medical instrument of claim 10 in which said closure means is a spring clip attached to a restraining tension member of predetermined length, said tension member anchored at its opposite end to said casing.

10. Apparatus for placing a flexible tubular probe into a tubular cavity comprising a thick-walled substantially rigid tube, a collapsed thin-walled flexible tubing inside of said tube, one end of said tubing circumferentially sealed over one end of said tube, the other end of said tubing closed, a closure sealed to the second end of said tube, said closure including means connected to said rigid tube for introducing fluid into said tube at a pressure higher than the pressure outside said tube and means connected to said rigid tube for withdrawing fluid from said tube at a pressure lower than the pressure outside said tube, whereby, when the fluid pressure inside said casing is higher than the pressure outside said casing, the fluid pressure will evert said tubing out through said opening, and when the pressure inside the casing is less than the pressure outside the casing, the fluid pressure outside will cause said tubing to be inverted into said casing.

11. Apparatus as in claim 10 in which said closure comprises a cup-shaped chamber adapted to be overlapping fitted to and sealed to said tube.

12. A medical probe adapted for use in a medical instrument into the casing of which the probe is placed, to the casing of which it is sealed and from the casing of which it is everted by fluid pressure in said instrument casing, said probe comprising, (a) a flexible, thin-walled eversible tubing having a length L, a diameter D, and a wall thickness T, (b) circumferential termination means attached circumferentially to and made a permanent and integral part of a first end of said tubing, said termination means adapted to be attached and sealed to one end of said instrument casing for mounting said probe in said casing, said termination extending axially beyond said first end of said casing when attached thereto and serving as a guide for the eversion of the tubing therethrough, and (c) means for closing the second end of said tubing.

13. The probe means of claim 12 in which said termination means includes nozzle means adapted to guide the eversion of said probe from said casing.

14. The probe means of claim 12 in which the diameter D is in the range of 1/8 inch to one inch.

15. The probe means of claim 12 wherein the L/D ratio is at least 10.

16. The probe means of claim 12 wherein the wall thickness is in the range of 0.002 inch to 0.025 inch.

17. The probe means of claim 12 in which said second end is sealed over a short length of small diameter tube which is adapted for quick connection to instrument means.

18. The probe means of claim 12 in which said second end is adapted to be sealed over a small diameter instrument means.

19. The probe means of claim 12 in which said second end is sealed with a removable closure means.

20. The probe means of claim 12 in which at least a part of said tubing is made of a collagen-like material, adapted to be reacted upon by fluids in the cavity into which the probe is extraverted.

21. The probe means of claim 12 in which the probe tubing is a knitted tube of plastic material sealed with collagen-like material.

22. A medical probe for use in a medical instrument into the casing of which the probe is placed and from which it is everted by fluid pressure in said casing, said probe comprising, a flexible thin-walled eversible tubing, said tubing made of at least two materials, a first material insoluble in body fluids, said first material in the form of a flexible, porous-walled tubing, open at one end and having closure means at the other end, the second material comprising a material which reacts with body fluids, said second material placed so as to seal the pores of said first material to make said probe impervious.

23. Apparatus as in claim 22 in which said second material is a collagen-like material.

24. Apparatus as in claim 22 in which said first material comprises a knitted tube of plastic material.

25. Apparatus as in claim 22 in which said second material is in the form of a thin-walled flexible impervious tubing open at one end and sealed at the other end, which is placed inside of said porous walled tubing, with both open ends together.

26. A probe for use in an instrument from which it is extraverted by fluid pressure, comprising, a first length of thin-walled flexible tubing closed at one end, a second length of thin-walled flexible tubing closed at one end, said second tubing of smaller diameter than, and inside of said first tubing, the closed ends of both tubings connected by a tension member, and the open ends of said tubings sealed together circumferentially.

27. The probe of claim 26 in which the open ends of said tubings are sealed to a mounting means.

28. The probe of claim 26 in which a preselected volume of fluid is placed in the intertubing space.

29. The probe of claim 26 in which means are provided to introduce fluid into and remove fluid from the intertubing space after the two tubings are sealed together.

30. The probe as in claim 26 in which the outer tubing is porous and the inner tubing is impervious.

31. The probe as in claim 26 in which a volume of polymerizing cement is placed in the intertubing space.

32. The probe as in claim 26 in which the material of which the outer tubing is constructed comprises a polymerizing material such as to take on a permanent shape corresponding to that of the surface with which it is pressed in contact.

33. A medical instrument for extraverting a long tubular probe into an elongated constricted cavity comprising, a first tubular casing, a first thin-walled flexible evertable tubing closed at one end and sealed at its other end circumferentially to a first end of said first casing, said first tubing forming an extension of said first casing, a second tubular casing adapted to be inserted into and sealed to said first tubular casing, a second thin-walled flexible evertable tubing closed at one end and sealed at its other end circumferentially to the first end of said second casing, said second tubing forming an extension of said second casing, said second casing and second tubing inserted into said first casing, the closed ends of said two tubings joined with a tension member, and means to introduce fluid under pressure into the inside of the second casing, and into the inter-casing space.

34. A thin-walled flexible evertible probe for use in an instrument into which it is placed, to which it is sealed and from which it is everted by a combination of means to temporarily close off the central passage through said probe and fluid pressure in said instrument, said probe comprising a double thin-walled flexible tubing the two walls of which are sealed together circumferentially at each end to form a closed annular volume between the two walls and a central passage inside the inner wall, means to circumferentially attach and seal said double-walled tubing at one end to a substantially rigid tubular mounting means and means to introduce fluid into the annular volume in said probe.

35. A thin-walled evertible tubular probe for eversion into a body cavity, comprising, a length of thin-walled flexible tubing, one portion of said tubing being turned inside out over the other portion so as to provide an inner and an outer layer of tubing, the two ends being sealed together circumferentially to form an annular volume between the two layers with a clear central passage inside the inner layer, said circumferential seal including substantially rigid tubuar mounting means, means to introduce fluid into the annular volume between said inner and said outer layers, and means to temporarily close off said central passage, whereby when said mounting means is placed at the mouth of said cavity, said probe can be everted through said mounting means into said cavity.

36. Apparatus as in claim 35 in which said two ends are circumferentially sealed separately to said tubular mounting means.

37. Apparatus as in claim 35 in which a first end is attached circumferentially to said tubular mounting means, and the second end is sealed to said first end.

38. In a method in which a probe comprising two lengths of thin-walled flexible tubing, one inside the other, with one end of each closed and tied to the other by means of a short tension member, the open ends sealed circumferentially to each other, with means for introducing fluid into the annular space between the two tubings, said probe placed inside a chamber in said instrument with the sealed-together open ends of said tubings sealed circumferentially over an opening in said chamber, said chamber otherwise closed, with means to introduce fluid under pressure into said chamber, the method of making a replica of the surface contour of a body cavity, comprising the steps of,
- (a) placing said instrument so that said opening is at the mouth of said cavity,
- (b) introducing fluid into said chamber under pressure to evert said probe through said opening into said cavity,
- (c) introducing a volume of self-hardening cement into the annular space between said two tubings of said probe,
- (d) increasing and holding fluid pressure inside said everted probe to maintain intimate contact between said probe and the walls of said cavity until said cement has hardened and fastened the two tubings securely together in the contour of said surface, and
- (e) retrieving said probe.

39. In a method in which a probe comprising two lengths of thin-walled flexible tubing, one inside the other, with one end of each closed and tied to the other by means of a short tension member, the open ends sealed circumferentially to each other, with means for introducing fluid into the annular space between the two tubings, said probe placed inside a chamber in said instrument with the sealed-together open ends of said tubings sealed circumferentially over an opening in said chamber, said chamber otherwise closed, with means to introduce fluid under pressure into said chamber, said probe comprising a tubing on the inside which is impervious, and a tubing on the outside comprised of a polymerizable material, the method of making a replica of the surface contour of a body cavity, comprising,
- (a) placing said instrument so that said opening is at the mouth of said cavity,
- (b) introducing fluid into said chamber under pressure to evert said probe into said cavity,
- (c) introducing a volume of polymerizing accelerator into the annular space between said two tubings of said probe,
- (d) increasing and holding fluid pressure inside said everted probe to maintain intimate contact between said probe and the walls of said cavity until the polymerizable outer tubing contacted by said polymerizing accelerator has polymerized and hardened in the contour of said surface, and
- (e) retrieving said probe.

40. In an instrument for the eversion of a long flexible, thin-walled, tubular probe from a tubular chamber by fluid pressure, in which the probe is a separate part, which is inserted through an opening into said chamber and which carries a termination at one end adapted to fit and be sealed to said opening, and is closed at the other end, the improvement comprising, a protector for said probe, comprising, a semi-rigid elongated cylindrical portion, an enlarged turned-back, tubular portion at one end adapted to snugly fit over said termination, said cylindrical portion of smaller diameter than, and adapted to be placed inside of, to extend substantially to the closed end of and to support said probe, when said tubular portion fits said termination,
whereby when said protector is applied to said probe the flexible probe is supported by said cylindrical portion and said probe can be inserted closed end first into said chamber through said opening.

41. A medical instrument for placing a flexible tubular probe into a tubular body cavity comprising a tubular casing with one end closure, a probe inserted into said casing, said probe comprising a length of thin-walled flexible tubing, one portion of said tubing being turned inside out over the other portion, so as to provide an inner and an outer layer of tubing, the two ends of said tubing being sealed together circumferentially to form an annular volume between the two layers, said circumferential seal including substantially rigid tubular mounting means, means to introduce fluid into the annular volume between said inner and said outer layers, said tubular mounting means sealed circumferentially to the open end of said casing, means for temporarily closing the open end of said probe, and means for introducing fluid into said casing, whereby when the end of said probe is closed and fluid is introduced into said casing, said probe will be everted from said casing through said opening.

42. In a method for placing a flexible evertible tubular probe into a cavity by eversion of said probe from a pressure tight tubular casing by fluid pressure, said probe comprising a length of thin-walled flexible tubing, one portion of said tubing being turned inside out over the the other portion so as to provide an inner and an outer layer of tubing, the two ends of said tubing being sealed together circumferentially to form an annular volume between the two layers, said circumferential seal including substantially rigid tubular mounting means, means to introduce fluid into the annular volume between said inner and said outer layers, said probe placed inside said casing and said mounting means sealed circumferentially over an opening in said casing, the method of everting said probe from said casing comprising the steps of,
- (a) placing the opening of said casing at the mouth of said cavity,
- (b) introducing fluid under pressure $P_1$ into the annular space between the two layers of said probe until the inner tubing is collapsed, closing the passage therethrough,
- (c) introducing fluid under pressure $P_2$ in said casing until said probe is everted through said opening into said cavity by said fluid pressure, and
- (d) removing fluid from said annular space until said inner passage through said probe is open.

43. Apparatus for everting a tubular flexible probe into an elongated cavity, comprising
- (1) a probe,
  - (a) said probe comprised of a thin-walled flexible tubing,
  - (b) one part of said tubing turned inside out over the other part so as to provide an inner and an outer layer of tubing,
  - (c) the two ends being sealed together circumferentially to form an annular volume between the two layers,
  - (d) said circumferential seal including substantially rigid tubular mounting means,
  - (e) said tubing extending longitudinally away from said mounting means,
  - (f) said mounting means adapted to be placed at the mouth of said cavity,
- (2) means to introduce fluid under pressure $P_1$ into said annular volume and
- (3) means for passing said probe through itself to be everted out through said mounting means,
whereby when said mounting means is placed at the mouth of said cavity, said probe will be everted through said mounting means into said cavity.

44. Apparatus as in claim 43 including closed housing means surrounding said probe and sealed to said mounting means, and means to introduce fluid under pressure $P_2$ into said housing means.

45. Apparatus as in claim 44 in which said means to evert said tubing comprises removable clamp means to close the inner end of said probe, tension means of predetermined length connecting said clamp means to said housing, combined with said fluid pressure $P_2$ in said housing.

46. Apparatus as in claim 44 in which said means to evert said tubing comprises fluid pressure $P_1$ in said annular volume combined with fluid pressure $P_2$ in said housing means, whereby as said pressure $P_1$ is increased to compress the inner layer of tubing and close off the passage therethrough, and as said pressure $P_2$ is increased, said probe will be progressively everted through said mounting means into said cavity.

References Cited

UNITED STATES PATENTS

| | | | |
|---|---|---|---|
| 3,168,092 | 2/1965 | Silverman | 128—1.2 |
| 3,178,732 | 4/1965 | Stibitz | 5—81 |
| 3,227,154 | 1/1966 | Cook | 128—2 |
| 3,247,841 | 4/1966 | Cook | 128—2 |
| 3,283,894 | 11/1966 | Hafner et al. | 206—16.5 |
| 3,314,430 | 4/1967 | Alley et al. | 128—350 |

DALTON L. TRULUCK, Primary Examiner

U.S. Cl. X.R.

128—262, 356